United States Patent
Bennett et al.

(10) Patent No.: US 12,014,621 B2
(45) Date of Patent: Jun. 18, 2024

(54) DYNAMIC ENCRYPTED ON-DEVICE STORAGE FOR SESSION QUALITY-AGNOSTIC MOBILE BUG EVIDENCE PRESERVATION

(71) Applicant: Callyo 2009 Corp, St. Petersburg, FL (US)

(72) Inventors: Christopher Ryan Bennett, St. Petersburg, FL (US); Derek Anthony Seroky, St. Petersburg, FL (US); Robert Beauchamp Menke, St. Petersburg, FL (US)

(73) Assignee: CALLYO 2009 CORP, St. Petersburg, FL (US)

(*) Notice: Subject to any disclaimer, the term of this patent is extended or adjusted under 35 U.S.C. 154(b) by 440 days.

(21) Appl. No.: 16/716,155

(22) Filed: Dec. 16, 2019

(65) Prior Publication Data

US 2020/0380142 A1    Dec. 3, 2020

Related U.S. Application Data

(60) Provisional application No. 62/854,552, filed on May 30, 2019.

(51) Int. Cl.
*G06F 3/16* (2006.01)
*G06F 21/60* (2013.01)
(Continued)

(52) U.S. Cl.
CPC ............. *G08B 6/00* (2013.01); *G06F 3/165* (2013.01); *G06F 21/602* (2013.01);
(Continued)

(58) Field of Classification Search
CPC .......... G08B 6/00; H04W 76/19; H04W 4/90; H04W 76/10; H04W 12/02; H04W 80/10;
(Continued)

(56) References Cited

U.S. PATENT DOCUMENTS 10,187,518 B2   1/2019   Bennett
10,360,775 B1   7/2019   Saboune et al.
(Continued)

OTHER PUBLICATIONS

United Stated Office Action, U.S. Appl. No. 16/511,949, filed Apr. 3, 2020, 9 pages.
(Continued)

*Primary Examiner* — Alexander Lagor
*Assistant Examiner* — Zoha Piyadehghibi Tafaghodi

(57) ABSTRACT

A system and a method are disclosed for on-device storage at a mobile bug of data of a one-way communications session where quality deteriorates. In an embodiment, a mobile bug receives a request to establish a one-way communications session, and responsively transmits data to a database for storage while refraining from storing the transmitted data subsequent to the transmission of the data. The mobile bug detects a deterioration in the one-way communications session that prevents, at least in part, the transmission of the data. Responsive to detecting the deterioration, while the deterioration is detected, the mobile bug stores the data in an encrypted format. The mobile bug detects a request for the data stored at the mobile bug, and responsively transmits the data to the database and deletes the data from the mobile bug.

19 Claims, 6 Drawing Sheets

(51) Int. Cl.
*G08B 6/00* (2006.01)
*H04M 1/656* (2006.01)
*H04M 3/22* (2006.01)
*H04W 4/90* (2018.01)
*H04W 12/02* (2009.01)
*H04W 76/10* (2018.01)
*H04W 76/19* (2018.01)
*H04W 80/10* (2009.01)

(52) U.S. Cl.
CPC ......... *H04M 1/656* (2013.01); *H04M 3/2281* (2013.01); *H04W 4/90* (2018.02); *H04W 12/02* (2013.01); *H04W 76/10* (2018.02); *H04W 76/19* (2018.02); *H04W 80/10* (2013.01)

(58) Field of Classification Search
CPC ...... G06F 3/165; G06F 21/602; H04M 1/656; H04M 3/2281
See application file for complete search history.

(56) References Cited

U.S. PATENT DOCUMENTS

| | | | |
|---|---|---|---|
| 10,796,542 | B1 | 10/2020 | Bennett et al. |
| 2002/0039904 | A1* | 4/2002 | Anderson ................. G01S 5/02 455/457 |
| 2005/0047570 | A1* | 3/2005 | Schmid ................. H04M 7/009 379/189 |
| 2009/0016501 | A1* | 1/2009 | May ........................ H04M 1/82 379/93.09 |
| 2009/0207987 | A1* | 8/2009 | Ryan .................... H04M 3/2281 379/188 |
| 2010/0260038 | A1* | 10/2010 | Dhodapkar ........... H04W 76/45 370/216 |
| 2012/0134480 | A1* | 5/2012 | Leeds ............... H04M 3/42348 379/88.14 |
| 2012/0309379 | A1 | 12/2012 | Bennett |
| 2014/0270154 | A1* | 9/2014 | Lum ................... H04M 3/5183 380/28 |
| 2015/0070150 | A1 | 3/2015 | Levesque et al. |
| 2015/0170023 | A1 | 6/2015 | Chatterjee et al. |
| 2015/0365520 | A1* | 12/2015 | Bennett ............. H04M 1/72484 455/417 |
| 2016/0036868 | A1* | 2/2016 | Brewer ............... H04M 7/1275 370/352 |
| 2016/0178906 | A1 | 6/2016 | Rider et al. |
| 2016/0189116 | A1 | 6/2016 | Cattone |
| 2016/0261996 | A1* | 9/2016 | Malik ..................... H04W 4/90 |
| 2016/0309012 | A1 | 10/2016 | Bennett |
| 2018/0184351 | A1* | 6/2018 | Voloshin ............... H04W 76/12 |
| 2019/0035242 | A1* | 1/2019 | Vazirani ................. G08B 15/00 |
| 2019/0095655 | A1* | 3/2019 | Krawczewicz ........... H04L 9/32 |
| 2019/0163272 | A1 | 5/2019 | Khare et al. |

OTHER PUBLICATIONS

United States Office Action, U.S. Appl. No. 16/438,809, filed Oct. 14, 2020, seven pages.

* cited by examiner

DYNAMIC ENCRYPTED ON-DEVICE STORAGE FOR SESSION QUALITY-AGNOSTIC MOBILE BUG EVIDENCE PRESERVATION

CROSS REFERENCE TO RELATED APPLICATIONS

This application claims the benefit of U.S. Provisional Application No. 62/854,552, filed May 30, 2019, the disclosure of which is hereby incorporated by reference herein in its entirety.

TECHNICAL FIELD

The disclosure generally relates to the field of covert mobile bug applications (e.g., cellular body wire applications), and more specifically to configuring a mobile bug to preserve evidence where session quality has deteriorated.

BACKGROUND

In covert operations scenarios where a transmitting person has audio transmitted to a monitoring team, it is risky for the transmitting person to carry a transmitting device, as the transmitting device can be discovered by a bad guy, thus compromising the transmitting person's identity and safety. Related art systems thus enable cellular telephones to be configured to act as a transmitting device, where the transmitting device initiates audio, and then the monitoring team can listen in. In such scenarios, the risk of the transmitting person being caught is reduced because it is not obvious that the cellular telephone is being used to transmit audio. However, if the transmitting person is caught, the bad guy might tamper with the transmitting device and any locally stored copy of the audio, thus reducing or destroying the evidentiary value of the audio.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system environment including a mobile bug, a monitoring device, a monitoring service, and a secure database.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes selectively initiating on-device storage at a mobile bug during a one-way communications session. In an embodiment, on-device storage is initiated in a scenario where the mobile bug experiences deterioration of quality during a one-way communications session. This helps limit the scenario where the on-device storage may be used against the wishes of the transmitting person (e.g., for undesirable evidence discovery, or tampering by a bad guy), in that on-device storage is initiated only at a necessary time. Further, the stored data may be encrypted to disable a playback opportunity from the mobile bug itself.

In an embodiment, a mobile bug receives a request to establish a one-way communications session. Responsive to receiving the request, The mobile bug transmits data to a database for storage while refraining from storing the transmitted data subsequent to the transmission of the data. The mobile bug may detect a deterioration in the one-way communications session that prevents, at least in part, the transmission of the data. Responsive to detecting such deterioration, while the deterioration is detected, the mobile bug may store the data at the mobile bug in an encrypted format. The mobile bug may detect a request for the data stored at the mobile bug. Responsive to detecting the request for the data stored at the mobile bug, the mobile bug may transmit the data to the database, and delete the data from the mobile bug.

Mobile Bug System Environment

Figure 1:
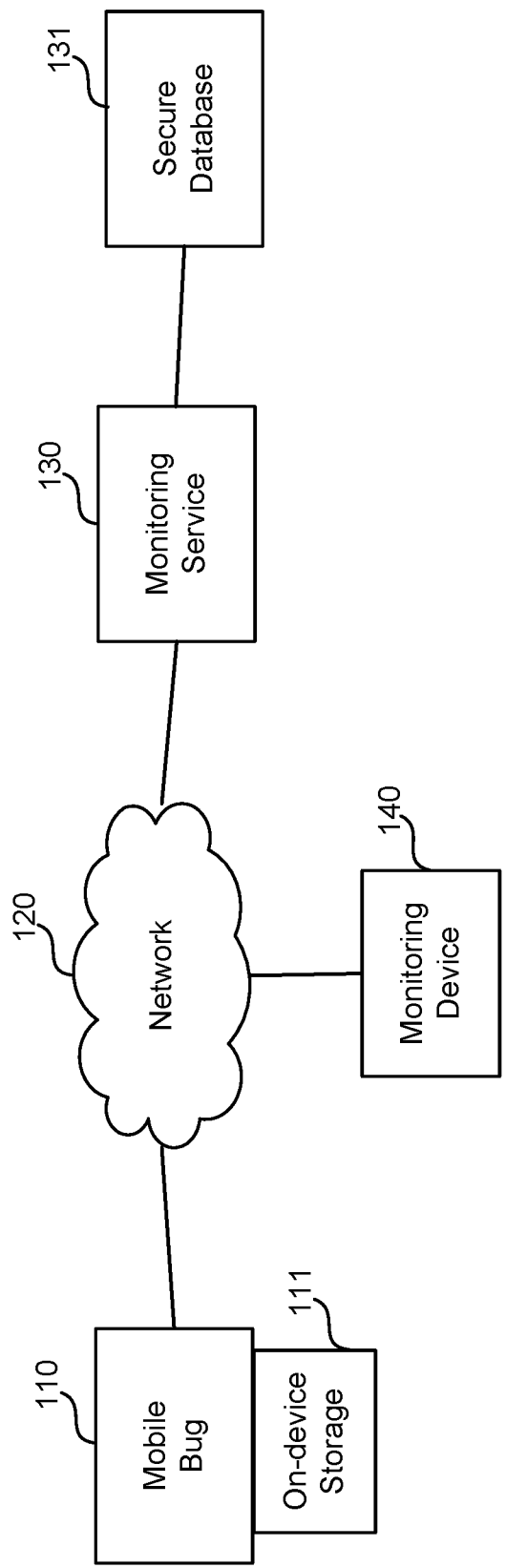

Figure (FIG. 1 illustrates one embodiment of a system environment including a mobile bug, a monitoring device, a monitoring service, and a secure database. FIG. 1 depicts environment 100, which includes mobile bug 110, on-device storage 111, network 120, monitoring service 130, secure database 131, and monitoring device 140. Mobile bug 110 may be any client device, including but not limited to smartphones, laptops, wearable devices such as smart watches, Internet-of-Things devices, peripheral devices, and the like. While only one mobile bug 110 is depicted, several mobile bugs may be included within environment 100.

Mobile bug 110 is configured to transmit data, which may include audio, location data (e.g., GPS data), video, biometric data (e.g., heart rate), and any other data requested by monitoring device 140, over network 120 during a one-way communications session. The data may be transmitted over a single connection (e.g., a data component of a cellular signal, WiFi, Wide Area Network signal, or similar), or may be split across multiple connections (e.g., audio components transmitted over a public-switched telephone network; data components such as GPS and/or video transmitted over data networks, etc.). Network 120 may include infrastructure for single connection or split connection transmissions. Further functionality of network 120 is described below with reference to FIG. 5.

As used herein, the term one-way communications session may refer to a session where mobile bug 110 transmits data without outputting received data from a user interface of mobile bug 110. In an embodiment, during the one-way communications session, mobile bug 110 does not receive audio data from monitoring device 140. Alternatively, mobile bug 110 receives data from monitoring device 140 during the one-way communications session, but does not output (e.g., display or output audio through speaker) the received data. Further details about the functionality of mobile bugs are described in commonly-owned U.S. Pat. No. 10,187,518, filed May 12, 2017, and issued Jan. 22, 2019, the disclosure of which is hereby incorporated by reference herein in its entirety. Mobile bug 110 is configured to store data to on-device storage 111 according to certain circumstances, such as due to deterioration of a one-way communications session quality, as described further below with respect to FIGS. 2-4 and 6.

Monitoring service 130 facilitates establishment and reestablishment of a one-way communications session. As will be described in further detail with reference to FIG. 3, monitoring service 130 registers mobile bug 110 as a mobile bug, and monitoring device 140 as a monitoring device. Monitoring service 130 may receive a request to establish, or reestablish, a one-way communications session between mobile bug 110 and monitoring device 140 from either mobile bug 110 or monitoring device 140. Responsive to receiving the request, monitoring service 130 transmits instructions to mobile bug 110 to output data to monitoring device 140. In an embodiment, the instructions to mobile bug 110 include instructions to output the data to monitoring service 130 (e.g., for recording the data to memory for replay at a later time, for encrypting the data before it is passed to monitoring device 140, and the like). In an embodiment, monitoring service 130 stores the received data to secure database 131. Secure database 131 may receive the data and store it in encrypted format. The data may be received in encrypted format, or may be received in non-encrypted format, and may be converted to encrypted format when being stored to secure database 131. Monitoring service 130 may be implemented within one or more servers within environment 100. Some functionality of monitoring service 130 may be distributed to mobile bug 110 and/or monitoring device 140 (e.g., through an application installed on mobile bug 110 and/or monitoring device 140). Secure database 131 may be implemented as a sub-component of monitoring service 130, or may be a third-party database accessible by monitoring service 130 by way of network 120, rather than being co-located with monitoring service 130 as depicted. Secure database 131 may exist in multiple locations, such as both with monitoring service 130 and monitoring device 140.

Monitoring device 140 may request that a one-way communications session between mobile bug 110 and monitoring device 140 be established, or reestablished. Monitoring device 140 receives data from mobile bug 110. Monitoring device 140 may output the received data in real-time or near-real-time to one or more users of monitoring device 140 (e.g., by outputting audio using speakers operably coupled to monitoring device 140, by outputting GPS coordinates using a display operably coupled to monitoring device 140, and the like). Monitoring device 140 may store the received data (e.g., in encrypted fashion where secure database is co-located with monitoring device 140). Monitoring device 140 may be any client device, such as those described with respect to mobile bug 110, as well as any non-mobile device, such as a large personal computer, a server, and the like. Other client devices are described below with reference to FIG. 5.

Mobile Bug Details

Figure 2:
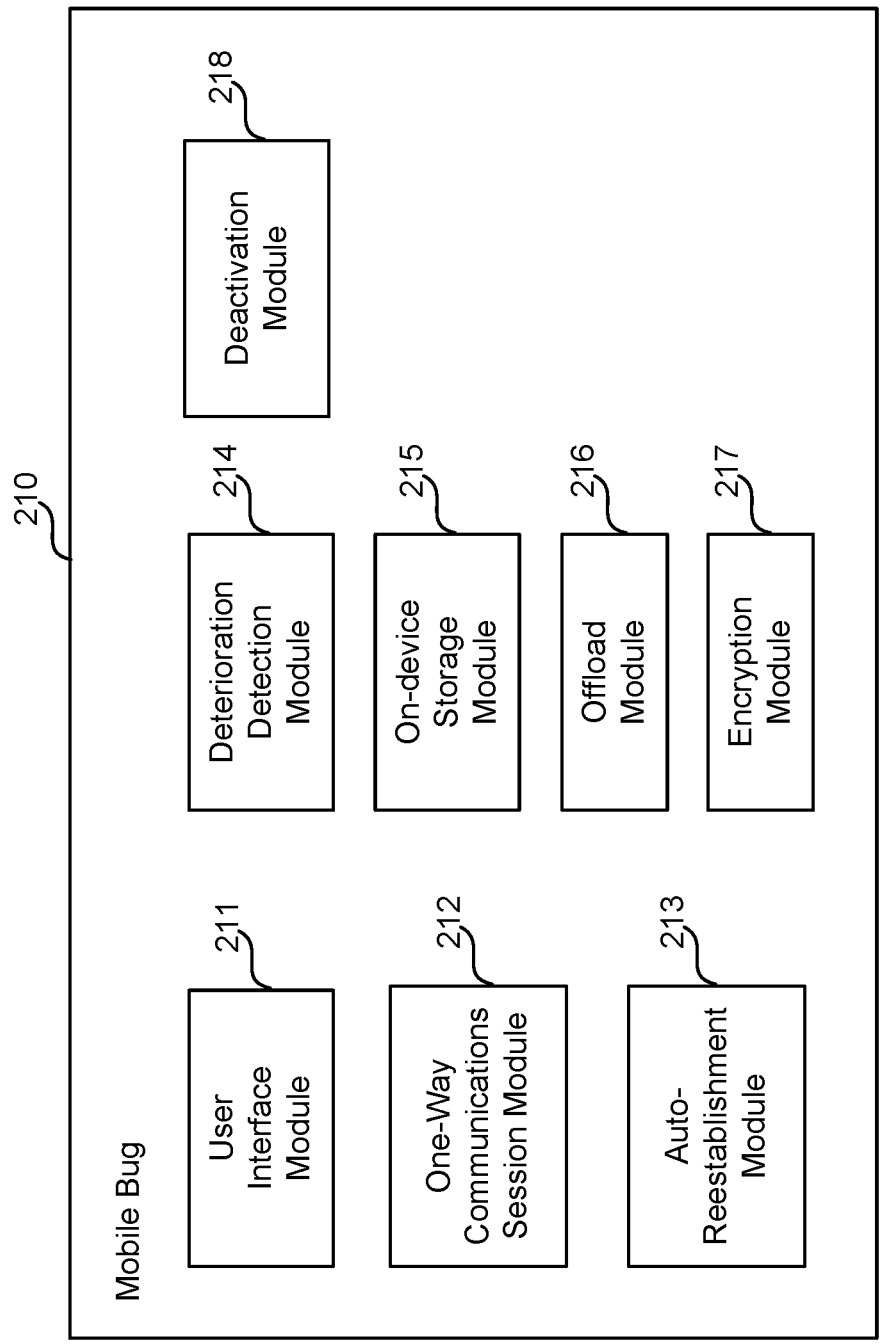
FIG. 2 illustrates one embodiment of a detailed view of modules within a mobile bug, including modules for managing on-device storage of data.

FIG. 2 illustrates one embodiment of a detailed view of modules within a mobile bug, including modules for managing on-device storage of data. Mobile bug 210 includes the same functionality described above with respect to mobile bug 110. Mobile bug 210 includes user interface module 211, one-way communications session module 212, auto-reestablishment module 213, deterioration detection module 214, on-device storage module 215, offload module 216, encryption module 217, and deactivation module 218. User interface module 211 enables user input for providing instructions from a transmitting person to monitoring service 130. In an embodiment, user interface module 211 may be provided by a browser that accesses a web address of monitoring service 130. In another embodiment, user interface module 211 may be provided by an application installed to mobile bug 110 that is configured to interact with monitoring service 130 based on user input received from the transmitting person and/or instructions received from monitoring service 130.

The transmitting person may use user interface module 211 to instruct monitoring service 130 to establish a one-way communications session between mobile bug 210 and one or more monitoring devices 140. In an embodiment, in order to facilitate the transmitting person by easing establishing a one-way communications session, user interface 211 may be configured to accept a symbol (e.g., a personal identification number, a predefined gesture, etc.) that is predefined to correspond to an establishment request. Responsive to determining that an entered symbol corresponds to an establishment request, user interface module 211 may instruct one-way communications session module 212 to establish a one-way communications session. The transmitting person may also use user interface module 211 to instruct mobile bug 210 to playback stored unencrypted data, or to offload data (whether encrypted or not), from on-device storage 111.

One-way communications session module 212, when executed, interacts with monitoring service 130 to establish a one-way communications session. One-way communications session module 212 may be executed based on input from user interface module 211 requesting establishment of a communications session. One-way communications session module 212 may be executed based on instructions from monitoring service 130 to the mobile bug 130 to initiate a one-way communications session (e.g., based on a request from monitoring device 140). Additionally, auto-reestablishment module 213 may detect a break in an already-established one-way communications session, and may command one-way communications session module 212 to execute to reestablish a one-way communications session. Auto-reestablishment module 213 may be disabled by the transmitting person, in which case it would not command reestablishment upon a break. Details of the role of mobile bug 210 in establishing a one-way communications session, or reestablishing a one-way communications session using an auto-reestablishment module (which, e.g., may instruct mobile bug 210 to redial monitoring service 130 and/or monitoring device 140) are described in further detail in commonly-owned U.S. Pat. No. 10,187,518, filed May 12, 2017, and issued Jan. 22, 2019, the disclosure of which is hereby incorporated by reference herein in its entirety.

Deterioration detection module 214 may be used in conjunction with auto-reestablish module 213 to detect a break, or deterioration, in an already-established one-way communications session. Deterioration detection module 214 detects whether the quality of one-way communications session has deteriorated beyond a level. Deterioration detection module 214 may monitor quality of any aspect, or multiple aspects, of the one-way communications session, including audio data, video data, auxiliary data (e.g., GPS data), or any other data that is flowing from mobile bug 210 as part of the one-way communications session. Deterioration detection module 214 determines that the quality of a one-way communications session has deteriorated when one or more aspects of the one-way communications session has quality fall below a threshold. The threshold may be predetermined by an administrator of the monitoring service, or may be set by the transmitting person or a member of the monitoring team. Thresholds may vary based on which aspect of the one-way communications session is being tracked. For example, audio quality may be considered to have deteriorated if there is a 60% loss of data in transmission, whereas video quality may be considered to have deteriorated if there is a 20% loss of data in transmission. This is because audio may be decipherable even with significant sporadic loss, whereas video may be unintelligible of more than a small amount of loss in quality occurs. Deterioration may be tracked with respect to a number of metrics, including loss of data (e.g., packets of a data stream being dropped en route to their destination), loss of bandwidth (e.g., slowdown in rate of packets of a data stream reaching their destination), and any other metric. The term deterioration as used throughout may be used in the singular, with respect to the one-way communications session, but equally applies to any aspect, or multiple (but not all) aspects of the one-way communications session experiencing deterioration.

On-device storage module 215 stores data responsive to mobile bug 210 having detected a deterioration in the one-way communications session. On-device storage module 215 may store the data to on-device storage 111. The purpose of storing the data to on-device storage 111 is to preserve a high quality version of the data that may be received by monitoring device 140 and/or monitoring service 130 with a deteriorated quality. On-device storage module 215 may store the data in raw format. In an embodiment, on-device storage module 215 stores the data in compressed format, compressing the data as it is received or in the process of storing the data. On-device storage module 215 may, regardless of the format of the stored data, encrypt the data. On-device storage module 215 may encrypt the data as part of the process of storing the data. In an embodiment, the data is originally stored as unencrypted, and is later encrypted. The process of encrypting the data is described below with respect to encryption module 216.

In an embodiment, on-device storage module 215 stores data regardless of whether mobile bug 210 has detected deterioration in the one-way communications session. The storage may occur responsive to determining that a one-way communications session is active, or responsive to a request from the transmitting person or from monitoring device 140. In an embodiment, where on-device storage module 215 stores data responsive to detecting deterioration in the one-way communications session, on-device storage module 215 may continue storing the data after reestablishment of the one-way communications session. In another embodiment, on-device storage module 215 may discontinue storing the data after reestablishment of the one-way communications session.

Encryption module 216 encrypts data that is stored to on-device storage 111. Encryption of the data is advantageous in that, if a bad guy steals the phone from the transmitting person, encryption would prevent the bad guy from accessing or playing back any of the data from the mobile bug. Moreover, encryption would prevent the data from being accessed from other parties that may use the data against the transmitting person or the monitoring team through an evidentiary discovery process, as the data would be impossible to unlock without the assistance from monitoring service 130.

Encryption module 216 encrypts the data using a public key located at mobile bug 210, which may be provided by monitoring service 130 or monitoring device 140. The data cannot be encrypted without a private key. In an embodiment, the private key is stored with monitoring service 130 (e.g., in an entry of secure database 131). The private key may additionally, or alternatively, be stored at monitoring device 140. Because the private key is not stored at mobile bug 210, data that is encrypted by encryption module 216 cannot be opened at mobile bug 210.

In an embodiment, encryption module 216 encrypts data as part of the process of being stored by on-device storage module 215. In another embodiment, encryption module 216 detects data being stored by on-device storage module 215, and then waits to encrypt the data for a predetermined period of time (e.g., 5 minutes, one hour), at which time encryption module 216 automatically encrypts the data. In an embodiment, encryption module 216 encrypts the data responsive to an instruction received from mobile bug 110, monitoring service 130, or monitoring device 114, to encrypt the data. Waiting a predetermined amount of time, or waiting for an express instruction to encrypt the data, is advantageous in that the transmitting person, or a member of the monitoring team (if a copy is received before encryption occurs) is able to check the integrity of the data before the data becomes locked by encryption, and can attempt to get similar data during a same operation if the data is not sufficient. The predetermined amount of time may be configured by the transmitting person and/or a member of the monitoring team, or may be a default amount of time set by monitoring service 130.

Offload module 217 transfers data stored by on-device storage 111 to secure database 131, either via monitoring service 130 or directly. Additionally or alternatively, offload module 217 transfers data stored by on-device storage 111 to monitoring device 140. Offload module 217 transfers the data responsive to a predetermined condition. In an embodiment, offload module 217 transfers the data responsive to a reestablishment request and/or the one-way communications session being reestablished (e.g., via auto-reestablishment module 213). In an embodiment, offload module 217 waits for the one-way communications session to end (e.g., by input from deactivation module 218 monitoring service 130, and/or monitoring device 140 commanding the end of the one-way communications session). In an embodiment, offload module 217 waits for one of these predetermined conditions to occur in conjunction with a favorable data transfer scenario, such as mobile bug 210 being connected to a WiFi network. Offload module 217 may transfer the data responsive to detecting a connection. The term connection may be any network connection, or may refer to a connection satisfying certain criteria (e.g., the aforementioned favorable data transfer scenario). Offload module 217 may refrain from transferring the data unless explicitly commanded to transfer the data by either the transmitting person or a member of the monitoring team. Any of these triggers being met may cause a request for data to be detected by mobile bug 210.

In an embodiment, transferring the data amounts to a full offload of the data—that is, offload module 217 transmits the data (in encrypted format), and also deletes the data from on-device storage 111. In another embodiment, mobile bug 210 maintains a copy of the encrypted data in on-device storage 111 either indefinitely, or until a predetermined condition occurs (e.g., on-device storage is full, in which case the oldest data is deleted; e.g., a predetermined amount of time has elapsed since storing the data; etc.).

Deactivation module 218 terminates the one-way communications session responsive to receiving a command from the mobile bug to do so (e.g., based on receipt of a command from the transmitting person or a member of the monitoring team). Deactivation module 218 may trigger offload module 217 to offload any data stored to on-device storage 111 during the one-way communications session as part of the deactivation process.

Monitoring Service Details

Figure 3:
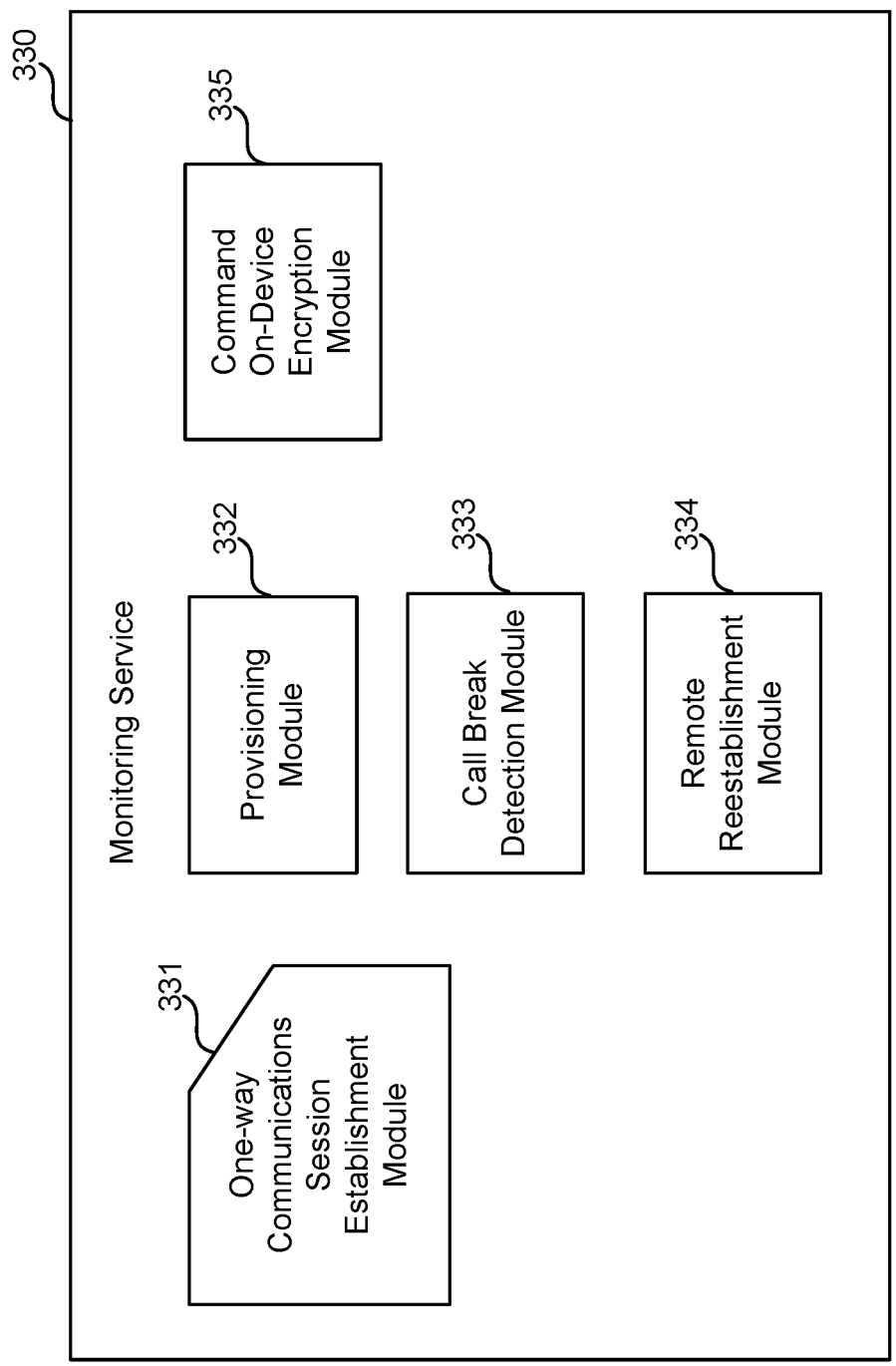
FIG. 3 illustrates one embodiment of a detailed view of modules within a monitoring service, including modules for commanding on-device encryption of data.

FIG. 3 illustrates one embodiment of a detailed view of modules within a monitoring service, including modules for commanding on-device encryption of data. Monitoring service 330 includes all functionality described above with respect to monitoring service 130, and includes one-way communications session establishment module 331, provisioning module 332, call break detection module 333, remote reestablishment module 334, and command on-device encryption module 335. One-way communications session establishment module 331 establishes a one-way communications session between mobile bug 110 and one or more monitoring devices including monitoring device 140, responsive to receiving an instruction to do so from mobile bug 110 and/or monitoring device 140. In an embodiment, one-way communications session establishment module 331 receives an instruction to establish the one-way communications session at a predetermined time, and waits until that predetermined time to establish the one-way communications session.

In order to establish a one-way communications session, monitoring service 130 executes provisioning module 332, which provisions various devices as mobile bugs and as monitoring devices. Based on the provisioning, one-way communications session establishment module determines which devices to establish the one-way communications session between. Further details on initial establishment of a one-way communications session and provisioning of mobile bugs and monitoring devices are described in commonly-owned U.S. Pat. No. 10,187,518, filed May 12, 2017, and issued Jan. 22, 2019, the disclosure of which is hereby incorporated by reference herein in its entirety.

While a one-way communications session is established, call break detection module 333 may detect a break in the one-way communications session. The term break, or call break, as used herein, may refer to an end to a part, or a whole, of a one-way communications session due to a partial or complete deterioration of quality of data transmitted during the one-way communications session, or due to a signal used to carry the data becoming unavailable (e.g., loss of cell signal). Call break detection module 333 may detect a call break where one component of the data (e.g., an audio component) is being transmitted at sufficient quality, but where another component of the data (e.g., a GPS component) is being transmitted at a poor quality (e.g., below a threshold level of quality), or is not being transmitted due to a poor or lost connection. Alternatively, call break detection module 333 may detect a call break where each component of the data is being transmitted at a poor quality, or the connection for all components is lost. Call break detection module 333 may instruct monitoring service 330 to transmit a message to mobile bug 110 and/or monitoring device 140 indicating that the call is broken, and/or that one or more particular components of the data is lost. In an embodiment, call break detection module 333 first determines whether mobile bug 110 has executed auto-reestablishment module 213, and if so, determines whether auto-reestablishment successfully occurred. Where mobile bug 110 has not executed auto-reestablishment module 213, or where auto-reestablishment module 213 is determined to have failed, call break detection module 333 may transmit the indication that the call is broken, and/or that one or more particular components of the data is lost. Rather than proactively determine whether a call quality has deteriorated at mobile bug 210, call break detection module 333 may, where a partial connection exists, transmit a signal to mobile bug 210 indicating deterioration. The signal may detail aspects of the one-way communications session that have deteriorated, and/or responsive action to be taken.

Remote reestablishment module 334 detects a request from monitoring device 140 to reestablish the one-way communications session based on a call break having been detected. Responsive to receiving such a request, remote reestablishment module 334 may reestablish the one-way communications session in the same manner described above with respect to initially establishing the one-way communications session. Where a component of data of a one-way communications session is lost or deteriorated, while another component continues to be transmitted, remote reestablishment module 334 may re-establish a data connection that enables that part of the data to be transmitted from mobile bug 110 to monitoring device 140 again, without reestablishing a link relating to a healthy data link.

Command on-device encryption module 335 transmits commands to mobile bug 110 for whether, when, and/or how to encrypt data for storage at on-device storage 111. In an embodiment, command on-device encryption module may transmit commands to mobile bug 110 to encrypt stored data when it is stored due to quality deterioration, or a predetermined time thereafter. The predetermined time may be received from a member of the monitoring team via monitoring device 140. Command on-device encryption module 335 may transmit instructions on file format, compression, and the like to mobile bug 110 to dictate the manner in which the data is encrypted. Command on-device encryption module 335 may transmit the public key to mobile bug 110 for use in encryption.

Monitoring service 330 may include additional modules, such as modules for transcribing data stored at secure database 131, and modules for searching by keyword for the transcribed data. Monitoring service 330 may encrypt the transcribed data and may require access credentials to decrypt the encrypted transcribed data.

Monitoring Device Details

Figure 4:
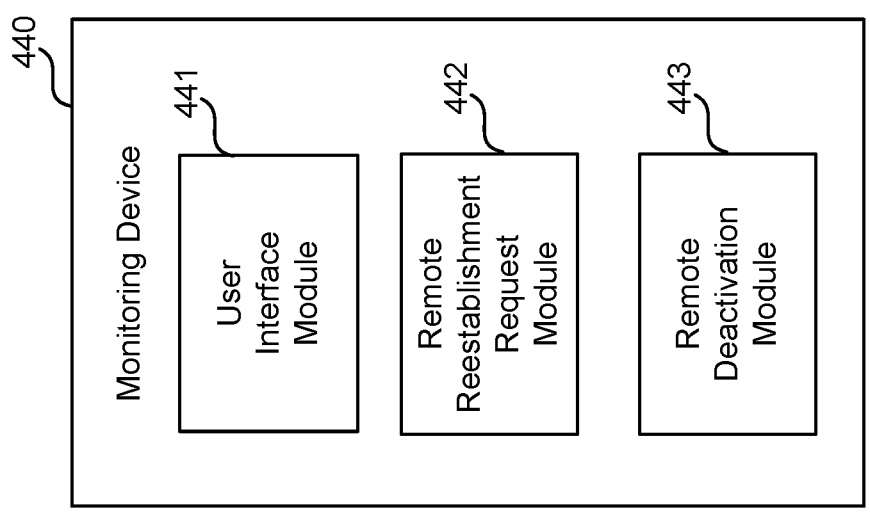
FIG. 4 illustrates one embodiment of a detailed view of modules within a monitoring device.

FIG. 4 illustrates one embodiment of a detailed view of modules within a monitoring device. Monitoring device 440 includes all functionality described above with respect to monitoring device 140, and includes user interface module 441, remote reestablishment request module 442, and remote deactivation module 443. User interface module 441 provides a user interface through which a member of the monitoring team may enter commands or receive information. For example, a member of the monitoring team using monitoring device 440 may select a mobile bug 110 with which to request establishment of a one-way communications session, or to receive a notification that a one-way communications session has begun. User interface module 441 may output data (e.g., audio, GPS, etc.) to the member of the monitoring team during the one-way communications session. User interface module 441 may indicate that come or all data of a one-way communications session is no longer being received due to a break in the one-way communications session. User interface module 441 may receive a command from the member of the monitoring team to reestablish the one-way communications session, and may responsively instruct monitoring device 440 to execute remote reestablishment request module 442. User interface module 441 may output confirmation that the request is successfully processed, or denial of the request, optionally with reasoning for why the request was denied, to the member of the monitoring team. User interface module 441 may receive a command to deactivate a one-way communications session, and may responsively instruct monitoring device 440 to execute remote deactivation module 443.

Remote reestablishment request module 442, responsive to receiving user input to request reestablishment of the one-way communication, instructs monitoring device 440 to request reestablishment of the one-way communications session by transmitting a request to the monitoring service 130 and/or mobile bug 110. Remote deactivation module 443, responsive to receiving user input to request reestablishment of the one-way communication, instructs monitoring device 440 to request, from monitoring service 130, that the one-way communications session be disconnected. In an embodiment, remote deactivation module 443 may automatically cause a deactivation request to be sent to monitoring service 130. A member of the monitoring team may input parameters that, if detected, trigger remote deactivation module 443 to request deactivation. For example, the parameters may be spoken keywords (e.g., "you are under arrest," or reading of Miranda rights), voice detection that matches a certain voice signature, facial recognition that matches a certain persons identity, and the like. Remote deactivation module 443 may include in a disconnection instruction an instruction to offload data stored at on-device storage 111 from the one-way communications session to monitoring service 130 and/or monitoring device 140.

Computing Machine Architecture

Figure 5:
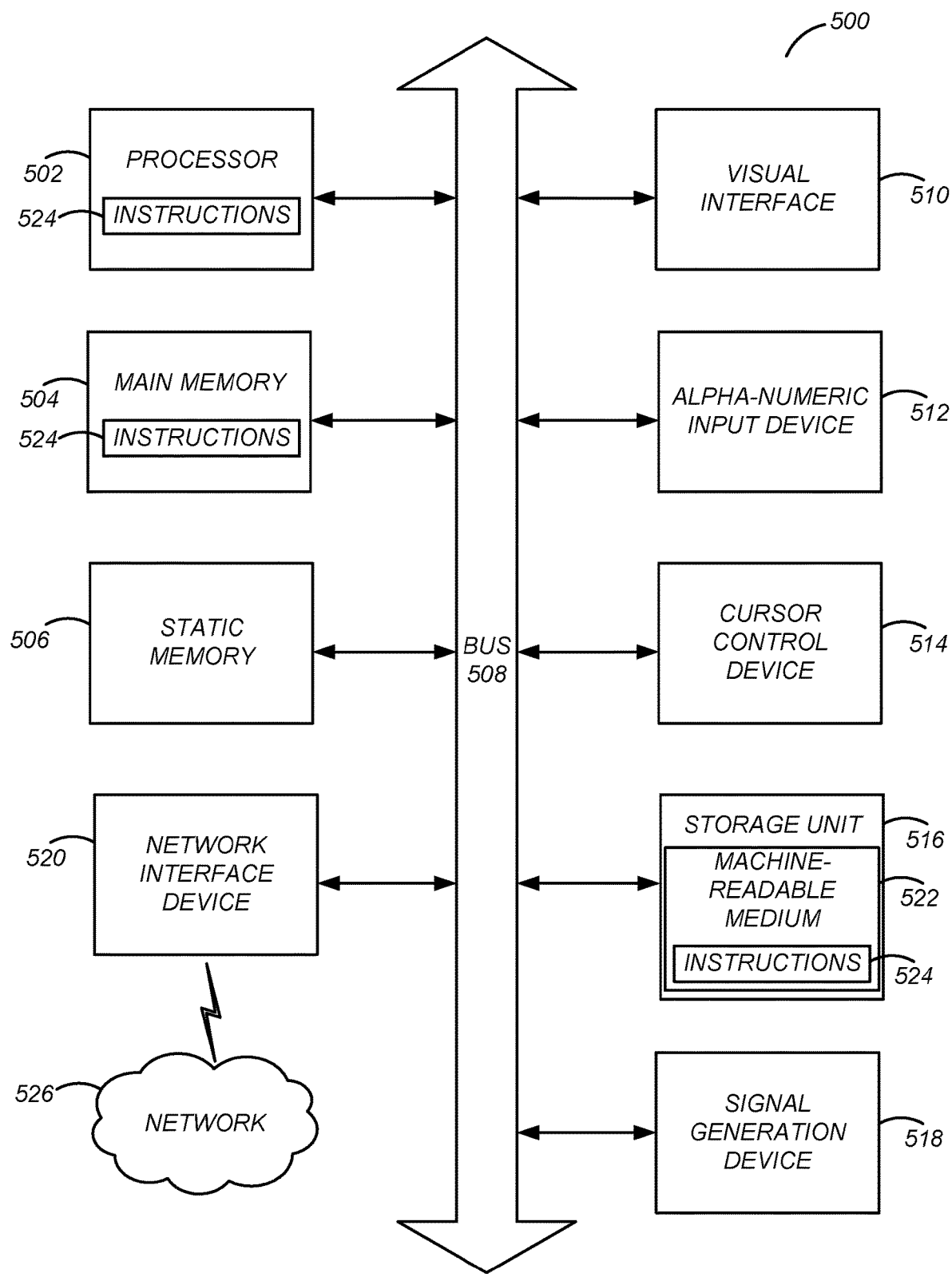
FIG. 5 illustrates one embodiment of a block diagram illustrating components of an example machine able to read instructions from a machine-readable medium and execute them in a processor (or controller).

FIG. (FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

On-Device Recording Based on Session Quality Deterioration

Figure 6:
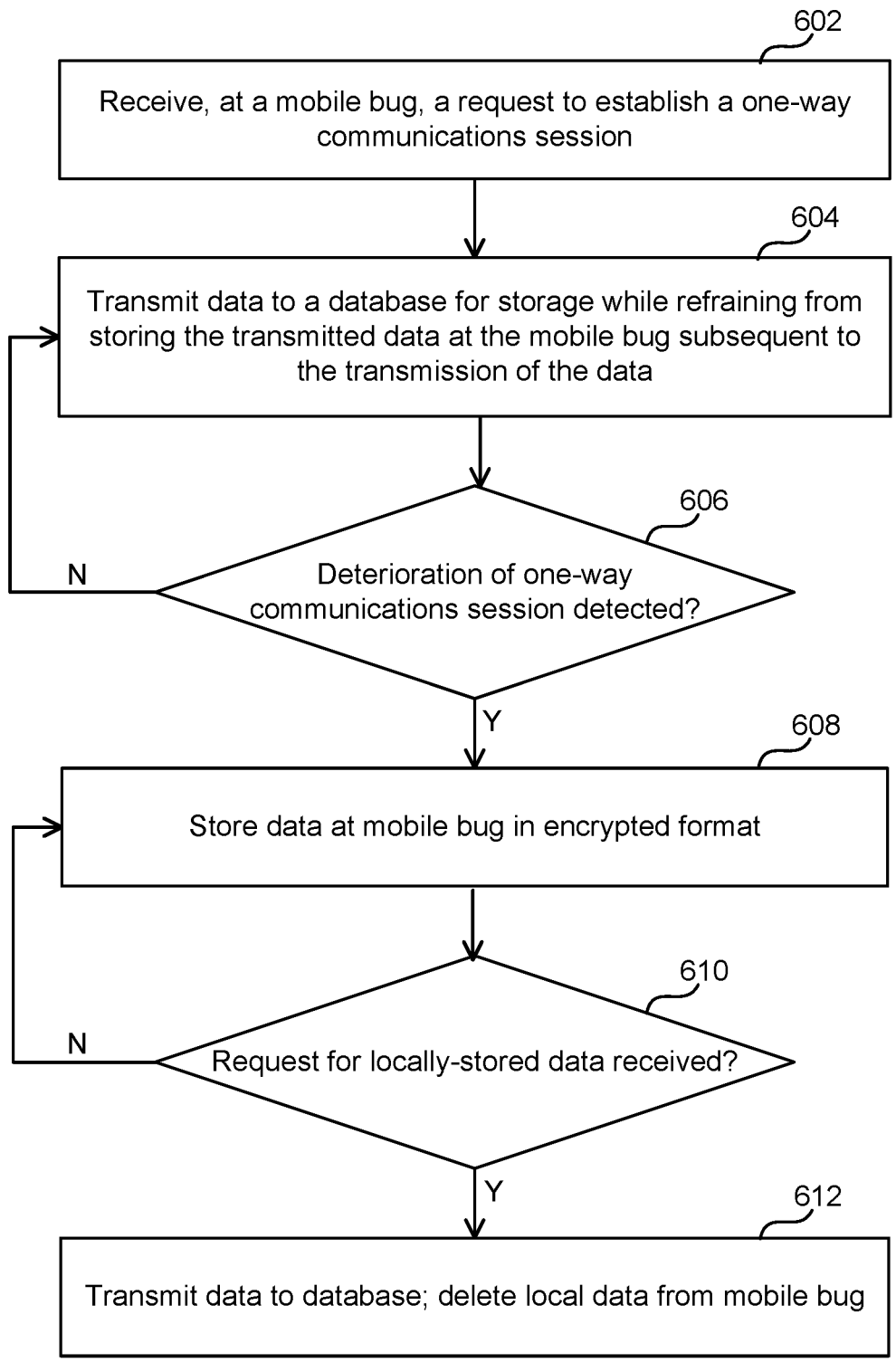
FIG. 6 illustrates one embodiment of a data flow diagram illustrating an exemplary data flow for causing a mobile bug to initiate on-device storage.

FIG. 6 illustrates one embodiment of a data flow diagram illustrating an exemplary data flow for causing a mobile bug to initiate on-device storage. Process 600 begins with a mobile bug (e.g., mobile bug 110) receiving 602 a request to establish a one-way communications session. The mobile bug transmits 604 data (e.g., audio, GPS, video, etc.) to a database (e.g., secure database 131) for storage while refraining from storing the transmitted data at the mobile bug subsequent to the transmission of the data. The mobile bug determines 606 whether deterioration of the one-way communications session is detected, and continues transmitting 604 where no deterioration is detected and the session is not commanded to be torn down. However, where deterioration is detected, the mobile bug stores 608 the data in an encrypted format. The mobile bug determines 610 whether it has received a request for locally-stored data. Alternatively, the mobile bug determines whether it has an existing instruction to monitor for a trigger for transmitting the locally-stored data to the database or to a monitoring device. Where the mobile bug determines 610 that it has not received the request, and no condition exists that triggers transmission of the data, the data continues to be stored, and remains stored, at the mobile bug (e.g., in on-device storage 111). However, where the request is received, or the trigger is detected (e.g., a connection is detected), the mobile bug transmits 612 the data to the database (e.g., secure database 131), and deletes the local data from the mobile bug (e.g., by deleting the data from on-device storage 111.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for storing data from a one-way communication session at on-device storage of a mobile bug where session quality deteriorates through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for preserving evidence obtained from a mobile bug during a one-way communications session, the method comprising:
   receiving, at a mobile bug, a request to establish a one-way communications session;
   responsive to receiving the request, the mobile bug capturing first audio data in an environment of the mobile bug and transmitting first data comprising the first audio data to a database for storage while the mobile bug operates in a first mode in which the mobile bug refrains from storing the first data subsequent to the transmission of the first data;
   detecting a deterioration in the one-way communications session that prevents transmission of data by the mobile bug during the one-way communications session;
   capturing, by the mobile bug, second audio data in the environment of the mobile bug after the detection of the deterioration;
   responsive to detecting the deterioration, while the deterioration is detected, causing the mobile bug to transition from operating in the first mode to operating in a second mode in which the mobile bug stores second data comprising the second audio data at the mobile bug in an encrypted format;
   detecting a request for the second data stored at the mobile bug; and
   responsive to detecting the request for the second data stored at the mobile bug:
      transmitting the second data to the database, and
      deleting, by the mobile bug, the second data from the mobile bug.

2. The method of claim 1, wherein the second data further comprises at least one of video data, multimedia data, location data, and biometric data.

3. The method of claim 1, wherein detecting the deterioration comprises detecting a break in the one-way communications session due to an inability for the mobile bug to continue accessing a network during the one-way communications session, and wherein detecting the request for the second data stored at the mobile bug comprises detecting a reestablishment request for the one-way communications session based on the break being repaired.

4. The method of claim 1, wherein detecting the deterioration comprises detecting a network issue that prevents the second data from being transmitted to the database.

5. The method of claim 4, wherein storing the second data at the mobile bug in the encrypted format comprises storing the second data in the encrypted format while refraining from storing the first data in the encrypted format.

6. The method of claim 1, wherein the encrypted format renders the second data unreadable by the mobile bug.

7. The method of claim 1, wherein the encrypted format renders the second data readable by the mobile bug for a predefined period of time, and wherein the method further comprises:
  determining whether the predefined period of time has lapsed; and
  responsive to determining that the predefined period of time has lapsed, transcoding the second data to another encrypted format that renders the second data unreadable by the mobile bug.

8. The method of claim 1, wherein the request for the second data stored at the mobile bug comprises a deactivation request for the one-way communications session.

9. The method of claim 8, wherein the deactivation request is initiated by the mobile bug.

10. A non-transitory computer-readable medium comprising instructions encoded thereon for preserving evidence obtained from a mobile bug during a one-way communications session, the instructions, when executed by one or more processors, causing the one or more processors to perform operations the instructions comprising instructions to:
  receive, at a mobile bug, a request to establish a one-way communications session;
  responsive to receiving the request, capture, by the mobile bug, first audio data in an environment of the mobile bug and transmit, by the mobile bug, first data comprising the first audio data to a database for storage while the mobile bug operates in a first mode in which the mobile bug refrains from storing the first data subsequent to the transmission of the data;
  detect a deterioration in the one-way communications session that prevents transmission of data by the mobile bug during the one-way communications session;
  capture, by the mobile bug, second audio data in the environment of the mobile bug after the detection of the deterioration;
  responsive to detecting the deterioration, while the deterioration is detected, cause the mobile bug to transition from operating in the first mode to operating in a second mode in which the mobile bug stores second data comprising the second audio data at the mobile bug in an encrypted format;
  detect a connection between the mobile bug and the database; and
  responsive to detecting the connection, transmit the second data to the database.

11. The non-transitory computer-readable medium of claim 10, wherein the second data comprises at least one of audio data, video data, multimedia data, location data, and biometric data.

12. The non-transitory computer-readable medium of claim 10, wherein the instructions to detect the deterioration comprise instructions to detect a break in the one-way communications session due to an inability for the mobile bug to continue accessing a network during the one-way communications session, and wherein the instructions to detect the connection comprise instructions to detect a reestablishment request for the one-way communications session based on the break being repaired.

13. The non-transitory computer-readable medium of claim 10, wherein the instructions to detect the deterioration comprise instructions to detect a network issue that prevents the second data from being transmitted to the database.

14. The non-transitory computer-readable medium of claim 13, wherein the instructions to store the second data at the mobile bug in the encrypted format comprise instructions to store the second data in the encrypted format while refraining from storing the first data in the encrypted format.

15. The non-transitory computer-readable medium of claim 10, wherein the encrypted format renders the second data unreadable by the mobile bug.

16. The non-transitory computer-readable medium of claim 10, wherein the encrypted format renders the second data readable by the mobile bug for a predefined period of time, and wherein the instructions further comprise instructions to:
  determine whether the predefined period of time has lapsed; and
  responsive to determining that the predefined period of time has lapsed, transcode the second data to another encrypted format that renders the second data unreadable by the mobile bug.

17. The non-transitory computer-readable medium of claim 10, wherein the connection comprises a deactivation request for the one-way communications session.

18. The non-transitory computer-readable medium of claim 17, wherein the deactivation request is initiated by the mobile bug.

19. A mobile bug computing device configured to perform a set of functions, the set of functions comprising:
  receiving a request to establish a one-way communications session;
  responsive to receiving the request, capturing first audio data in an environment of the mobile bug computing device and transmitting first data comprising the first audio data to a database for storage while the mobile bug computing device operates in a first mode in which the mobile bug computing device refrains from storing the first data subsequent to the transmission of the first data;
  detecting a deterioration in the one-way communications session that prevents transmission of data by the mobile bug computing device during the one-way communications session;
  capturing, by the mobile bug computing device, second audio data in the environment of the mobile bug computing device after the detection of the deterioration;
  responsive to detecting the deterioration, while the deterioration is detected, causing the mobile bug computing device to transition from operating in the first mode to operating in a second mode in which the mobile bug computing device stores second data comprising the second audio data in an encrypted format;
  detecting a request for the second data; and
  responsive to detecting the request for the second data:
    transmitting the second data to the database, and
    deleting the second data.

* * * * *